(12) United States Patent
Jung et al.

(10) Patent No.: US 7,675,653 B2
(45) Date of Patent: Mar. 9, 2010

(54) APPARATUS AND METHOD OF CONTROLLING SCANNER

(75) Inventors: Jung-woon Jung, Suwon-si (KR); Jeong-rae Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1042 days.

(21) Appl. No.: 11/365,695

(22) Filed: Mar. 2, 2006

(65) Prior Publication Data

US 2006/0290998 A1 Dec. 28, 2006

(30) Foreign Application Priority Data

Jun. 27, 2005 (KR) ...................... 10-2005-0055896

(51) Int. Cl.
 H04N 1/40 (2006.01)
 H04N 1/00 (2006.01)
 H04N 1/36 (2006.01)

(52) U.S. Cl. ........................ 358/468; 358/444; 358/404; 358/426.08; 358/412

(58) Field of Classification Search ................ 358/400, 358/404, 444, 468, 1.2, 1.16, 1.15, 505, 508, 358/532, 530, 405, 426.02, 426.08, 435, 358/426.11, 443, 447, 448, 471, 476, 486, 358/412, 436, 438, 439
See application file for complete search history.

(56) References Cited

U.S. PATENT DOCUMENTS

| | | | | |
|---|---|---|---|---|
| 6,002,429 | A * | 12/1999 | Ochi et al. | ............... 348/220.1 |
| 6,462,842 | B1 * | 10/2002 | Hamilton | ..................... 358/486 |
| 7,068,718 | B2 * | 6/2006 | Kim et al. | .............. 375/240.02 |
| 7,185,132 | B2 * | 2/2007 | Tang | .......................... 710/305 |
| 2003/0094495 | A1 * | 5/2003 | Knowles et al. | ........ 235/462.14 |
| 2003/0131122 | A1 * | 7/2003 | Kondo et al. | ................. 709/233 |
| 2004/0017591 | A1 | 1/2004 | Boyd | |
| 2006/0080490 | A1 * | 4/2006 | Tang | .......................... 710/313 |
| 2006/0244590 | A1 * | 11/2006 | Itoh et al. | .............. 340/539.23 |

FOREIGN PATENT DOCUMENTS

| | | | |
|---|---|---|---|
| CN | 1172393 | A | 2/1998 |
| JP | 11-17855 | | 1/1999 |
| JP | 2003069871 | * | 3/2003 |
| JP | 2004-188820 | | 7/2004 |
| KR | 1998-14279 | | 5/1998 |
| KR | 2000-829 | | 1/2000 |
| KR | 2001-37441 | | 5/2001 |
| KR | 2002-89670 | | 11/2002 |
| KR | 2004-75576 | | 8/2004 |
| KR | 2004-108622 | | 12/2004 |

OTHER PUBLICATIONS

Chinese Office Action dated Mar. 28, 2008, issued in CN 200610077201.7.
Korean Office Action dated Oct. 31, 2006 issued in KR 2005-55896.

* cited by examiner

*Primary Examiner*—Jerome Grant, II
(74) *Attorney, Agent, or Firm*—Stanzione & Kim LLP

(57) ABSTRACT

An apparatus and a method of controlling a scanner include a transmission speed detector and a controller. The transmission speed detector detects data transmission speed information between a host and the scanner. The controller controls a scanning speed of the scanner based on a scan resolution and the detected transmission speed information.

24 Claims, 7 Drawing Sheets

DISTORTED PART BY
JITTER PHENOMENON

| TRANSMISSION TYPE(VERSION) | MODE | SCAN RESOLUTION | MOTOR TIMER | SCAN BUFFER |
|---|---|---|---|---|
| USB 1.1 | LOW | 600DPI | 200PPS | 20MByte |
| USB 1.1 | HIGH | 600DPI | 400PPS | 4MByte |
| USB 1.1 | LOW | 1200DPI | 100PPS | 4MByte |
| USB 1.1 | HIGH | 1200DPI | 200PPS | 8MByte |
| USB 2.0 | LOW | 600DPI | 200PPS | 2MByte |
| USB 2.0 | FULL | 600DPI | 400PPS | 4MByte |
| USB 2.0 | HIGH | 600DPI | 800PPS | 16MByte |
| USB 2.0 | LOW | 1200DPI | 100PPS | 4MByte |
| USB 2.0 | FULL | 1200DPI | 200PPS | 8MByte |
| USB 2.0 | HIGH | 1200DPI | 400PPS | 32MByte |

FIG. 3B

| TRANSMISSION TYPE | MODE | SCAN RESOLUTION | MOTOR TIMER | SCAN BUFFER |
|---|---|---|---|---|
| IEEE 1284 | EPP | 600DPI | 300PPS | 4MByte |
| IEEE 1284 | EPP | 1200DPI | 600PPS | 8MByte |
| IEEE 1284 | ECP | 600DPI | 450PPS | 2MByte |
| IEEE 1284 | ECP | 1200DPI | 900PPS | 4MByte |

FIG. 3C

| TRANSMISSION TYPE | RESPONSE TIME | SCAN RESOLUTION | MOTOR TIMER | SCAN BUFFER |
|---|---|---|---|---|
| LAN | 10ms | 600DPI | 200PPS | 8MByte |
| LAN | 10ms | 1200DPI | 400PPS | 32MByte |
| LAN | 20ms | 600DPI | 250PPS | 6MByte |
| LAN | 20ms | 1200DPI | 450PPS | 28MByte |
| LAN | 40ms | 600DPI | 200PPS | 8MByte |
| LAN | 40ms | 1200DPI | 400PPS | 32MByte |

APPARATUS AND METHOD OF CONTROLLING SCANNER

CROSS-REFERENCE TO RELATED APPLICATIONS

This application claims the benefit under 35 U.S.C. §119 of Korean Patent Application No. 10-2005-55896, filed on Jun. 27, 2005, in the Korean Intellectual Property Office, the disclosure of which is incorporated herein in its entirety by reference.

BACKGROUND OF THE INVENTION

1. Field of the Invention

The present general inventive concept relates to an apparatus and a method of controlling a scanner, and more particularly, to an apparatus and a method of controlling a scanner capable of controlling a scanning speed according to a data transmission speed between a host and the scanner.

2. Description of the Related Art

A conventional scanning process is performed at a constant scanning speed. The scanning speed is typically determined by a scan resolution and a speed of a scan motor. The speed of the scan motor is fixed to one value according to a specification of each product regardless of the transmission speed of a connection device, such as universal serial bus (USB), local area network (LAN), and IEEE1394.

In a case in which the scanning speed is faster than the transmission speed, that is, a speed at which scanned data is recorded in a memory is faster than a speed at which the recorded data is read and transmitted to a host, the data is gradually accumulated in the memory and a memory-full error is generated. As such, the scanning process stops and is in a stand-by state until the data accumulated in the memory is read and transmitted to the host and a space of the memory to be used in recording is secured. After the space in the memory is secured, when the scanning process restarts, the scanner regresses an interval required for a uniform rotation of the motor from the suspended position and performs the scanning process again. During this process, a jitter phenomenon in which the position where the scanning process has stopped and the position where the scanning process restarts are different from each other may be generated. That is, an input image, as illustrated in FIG. 1A, might be output as a defective image, as illustrated in FIG. 1B, due to the jitter phenomenon.

Also, in a case in which the scanning speed is set to an excessively low speed, a scanning process is performed at a low speed even though the transmission speed of the connection device, such as the USB, is fast, such that the host cannot obtain an output image from the scanner in time. Accordingly, the scanning process is not performed efficiently.

SUMMARY OF THE INVENTION

The present general inventive concept provides an apparatus and a method of controlling a scanner that solves a problem associated with a memory due to inharmony between a transmission speed and a scanning speed and performs an efficient scanning process by controlling the scanner using the scanning speed and a buffer size corresponding to the transmission speed between a host and the scanner.

Additional aspects and utilities of the present general inventive concept will be set forth in part in the description which follows and, in part, will be obvious from the description, or may be learned by practice of the general inventive concept.

The foregoing and/or other aspects of the present general inventive concept may be achieved by providing an apparatus to control a scanner including a transmission speed detector to detect data transmission speed information between a host and the scanner, and a controller to control a scanning speed of the scanner based on a scan resolution and the detected transmission speed information.

The controller may control a size of a scan buffer based on the scan resolution and the detected transmission speed information.

The foregoing and/or other aspects of the present general inventive concept may also be achieved by providing an apparatus to control a scanner, including a transmission standard detector to detect a transmission standard used by the scanner to communicate with a host, and a controller to control a scanning speed of the scanner based on the detected transmission standard.

The foregoing and/or other aspects of the present general inventive concept may also be achieved by providing an image scanning apparatus, including a host interface to communicate with a host at a transmission speed, a transmission speed detector to detect transmission speed information regarding the transmission speed of the host interface, a controller to determine a scanning speed based on the detected transmission speed information, and a scanning part to scan data at the determined scanning speed.

The foregoing and/or other aspects of the present general inventive concept may also be achieved by providing an image scanning apparatus, including a scanning unit to scan data at a scanning speed, a host interface to transmit the scanned data to a host at a data transmission speed, and a controller to control the scanning speed of the scanning unit based on the data transmission speed of the host interface.

The foregoing and/or other aspects of the present general inventive concept may also be achieved by providing a method of controlling a scanner, the method including detecting data transmission speed information between a host and the scanner, and controlling a scanning speed of the scanner based on a scan resolution and the detected transmission speed information.

The method may further include controlling a size of a scan buffer based on the scan resolution and the detected transmission speed information.

The foregoing and/or other aspects of the present general inventive concept may also be achieved by providing a method of controlling a scanner, the method including detecting a transmission standard used by the scanner to communicate with a host, and controlling a scanning speed of the scanner based on the detected transmission standard.

The foregoing and/or other aspects of the present general inventive concept may also be achieved by providing a method of controlling a scanner, the method including determining a scanning speed of the scanner based on a data transmission speed at which the scanner communicates with a host, and scanning data at the determined scanning speed.

The foregoing and/or other aspects of the present general inventive concept may also be achieved by providing a computer-readable recording medium storing at least one computer program to perform a method of controlling a scanner, the method including detecting data transmission speed information between a host and the scanner, and controlling a scanning speed of the scanner based on a scan resolution and the detected transmission speed information.

The foregoing and/or other aspects of the present general inventive concept may also be achieved by providing a computer-readable recording medium storing at least one computer program to perform a method of controlling a scanner, the method including detecting a transmission standard used by the scanner to communicate with a host, and controlling a scanning speed of the scanner based on the detected transmission standard.

The foregoing and/or other aspects of the present general inventive concept may also be achieved by providing a computer-readable recording medium storing at least one computer program to perform a method of controlling a scanner, the method including determining a scanning speed of the scanner based on a data transmission speed at which the scanner communicates with a host, and scanning data at the determined scanning speed.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 2 is a block diagram illustrating an apparatus to control a scanner according to an embodiment of the present general inventive concept;

FIGS. 3A through 3C are views illustrating lookup tables according to an embodiment of the present general inventive concept in a case in which transmission standards of an USB, IEEE1284, and a network are used, respectively;

DETAILED DESCRIPTION OF THE PREFERRED EMBODIMENTS

Figure 1A:
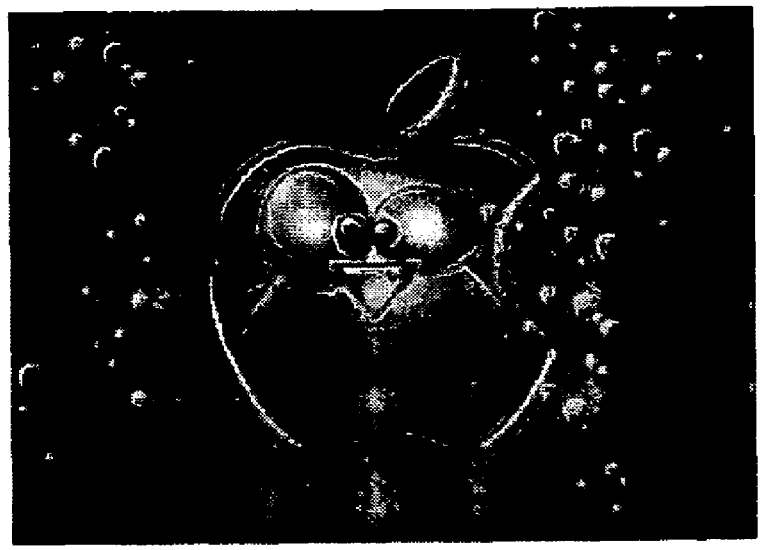
FIGS. 1A and 1B are views illustrating an image input to a conventional scanner and an output image distorted by a jitter phenomenon of the conventional scanner, respectively.
Figure 1B:
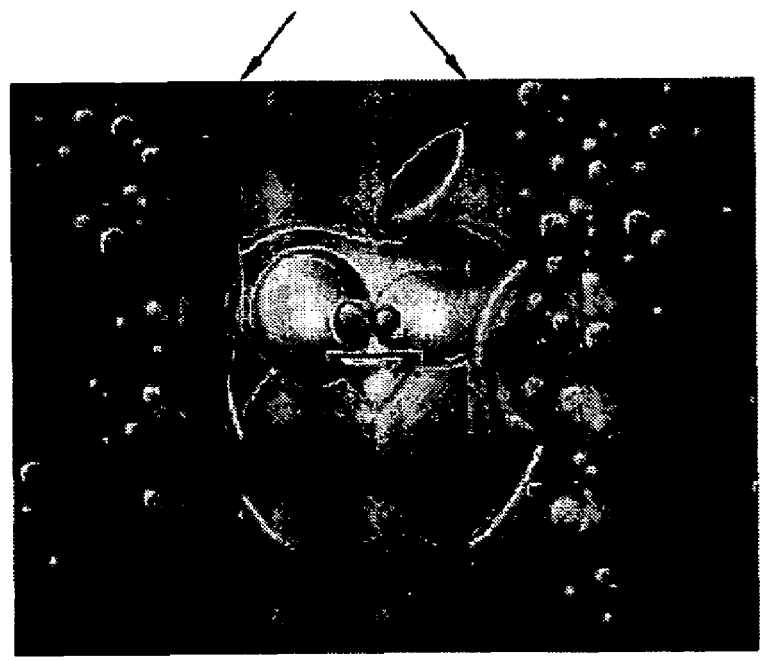

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figures 2, 3A:
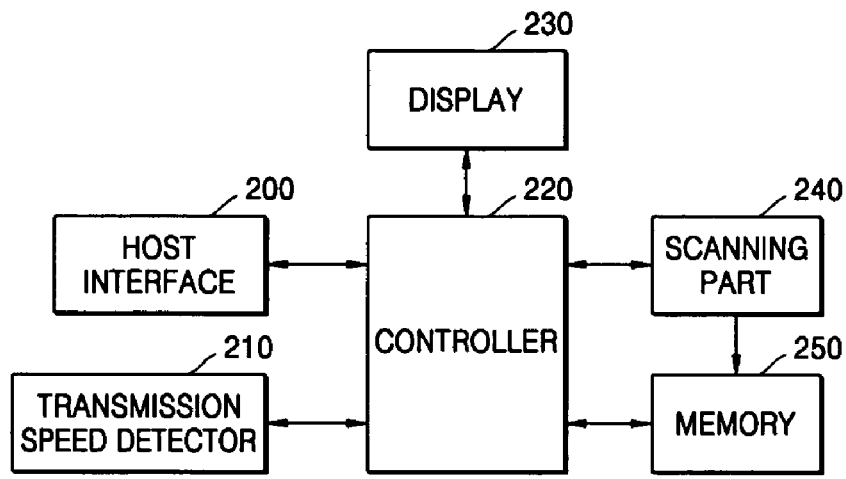

FIG. 2 is a block diagram illustrating an apparatus to control a scanner according to an embodiment of the present general inventive concept. Referring to FIG. 2, the apparatus includes a host interface 200, a transmission speed detector 210, a controller 220, a display 230, a scanning part 240, and a memory 250.

The host interface 200 transmits data between the scanner and a host. That is, the host interface 200 transmits scanned data to the host using at least one of a variety of transmission standards, such as a USB transmission standard, an IEEE1284 transmission standard, and a network transmission standard, and receives a scan command and a scan option from the host. Here, the host may be a computer that can be connected to the scanner or a personal digital assistant (PDA) or the like.

The transmission speed detector 210 detects data transmission speed information between the host and the scanner. The data transmission speed information between the host and the scanner is different depending on the transmission standard of the host interface 200. The USB transmission standard has a version 1.1 and a version 2.0. There are a low speed mode and a high speed mode in the USB version 1.1, and the low speed mode supports a transmission speed of 1.5 Mbps and the high speed mode supports a transmission speed of 12 Mbps. The USB version 2.0 has a low speed mode, a full-speed mode, and a high speed mode, which support transmission speeds of 1.5 Mbps, 12 Mbps, and 480 Mbps, respectively. The IEEE1284 transmission standard is classified into Compatibility, Nibble, Byte, EPP, ECP, which support transmission speeds of 50 kbps, 50 kbps, 500 kbps, 2 Mbps, 1 Mbps, respectively. In the case of the network transmission, a network response time can be used as an index of a network transmission speed. That is, the transmission speed information may be an actual transmission speed, or may be the version of the transmission standard, the mode of the transmission standard, or the network response time that correspond to the actual transmission speed. In other words, a general transmission speed of a wired/wireless interface (i.e., the host interface 200) between the host and the scanner can be detected. Alternatively, the transmission speed information can be detected from the version and the mode of the transmission standard of the host interface 200.

The host interface 200 can have drivers compatible with at least one of the USB and the IEEE1284 transmission standards, or a network card therein. The host interface 200 can also have a register to store information regarding the version or the mode of the at least one transmission standard therein. Therefore, the transmission speed detector 210 can detect the transmission speed information from the information stored in the register. In the case of the network transmission standard, the transmission speed detector 210 can detect the transmission speed information from the network response time obtained by applying a ping to the network card of the host interface 200. The transmission speed detector 210 may be included within the host interface 200 but is not limited thereto.

The controller 220 controls a scanning speed of the scanner based on scan resolution and the detected transmission speed. The scanning speed is determined by a speed of a scan motor, and the speed of the scan motor can be controlled by a timer value of the scan motor. Accordingly, the scanning speed appropriate for the scan resolution and the detected transmission speed are controlled by setting the timer value of the scan motor. Here, the scan resolution may be fixed and preset in the scanner or may be changeable and received from the host. For example, the scan resolution can be included in the scan option received from the host through the host interface 200. The scan resolution may also be changeable at the scanner using an operation panel, or the like, provided to the scanner.

The controller 220 can control a size of a scan buffer and simultaneously control the scanning speed of the scanner based on the scan resolution and the detected transmission speed information. The scan buffer is a storage space assigned to the scanned data in the memory 250. If the size of the scan buffer is fixed, it does not need to be controlled. However, if the size of the scan buffer in the memory 250 is variable, the size of the scan buffer can be controlled by the controller 220. Since an amount of space in the memory 250 needed to store the scanned data increases as the scan resolution and the scanning speed increase, the controller 220 can increase the size of the scan buffer according to the scan resolution and the scanning speed. Accordingly, the controller 220 sets an appropriate buffer size according to the scan resolution and the scanning speed so as to make an efficient use of the scan buffer.

The controller 220 can obtain an appropriate scanning speed and an appropriate size of the scan buffer using a lookup table storing the scan resolution, the transmission speed information, the appropriate scanning speed, and the appropriate size of the scan buffer according to various transmission standards. The lookup table may be provided to the controller 220 or stored in the memory 250. Alternatively, the lookup table may be provided separately from the elements of FIG. 2.

FIG. 3A is a view illustrating the lookup table according to an embodiment of the present general inventive concept in the case in which the USB transmission standard is used.

When the transmission speed information, i.e., the version and mode of the USB transmission standard is detected by the transmission speed detector 210 and the scan resolution is given, the controller 220 reads and obtains the value of the motor timer and the size of the scan buffer corresponding to the detected transmission speed information from the lookup table, as illustrated in FIG. 3A. Even though, as illustrated in FIG. 3A, the motor timer value (PPS: pulse per second) and the size of the scan buffer increase when the transmission speed and the scan resolution increase, a relationship between the motor timer value and the size of the scan buffer and the transmission speed and the scan resolution can change depending on the scanner used, and thus the relationship is not limited the embodiment of FIG. 3A.

FIG. 3B is a view illustrating a lookup table according to an embodiment of the present general inventive concept in the case in which the IEEE1284 transmission standard is used.

FIG. 3C is a view illustrating a lookup table according to an embodiment of the present general inventive concept in the case in which the network transmission standard is used.

The controller obtains the motor timer value and the size of the scan buffer from the lookup table corresponding to the transmission standard of the host interface 200, the obtained motor timer value and the size of the scan buffer are used by the scanning part 240 and the memory 250.

The display 230 displays information on an LCD under control of the controller 220 and may display the detected transmission speed information.

The scanning part 240 scans a document with the scanning speed obtained by the controller 220 and the scan resolution. The scanning speed is provided from the controller 220 and may be provided in the form of the motor timer value, as described above.

The memory 250 assigns a storage space having the size of the scan buffer for the scanned data and stores the scanned data provided from the scanning part 240 therein. The size of the scan buffer is provided from the controller 220. The stored scanned data is read by the controller 220 and delivered to the host through the host interface 200 according to the transmission standard of the host interface.

Figure 4:
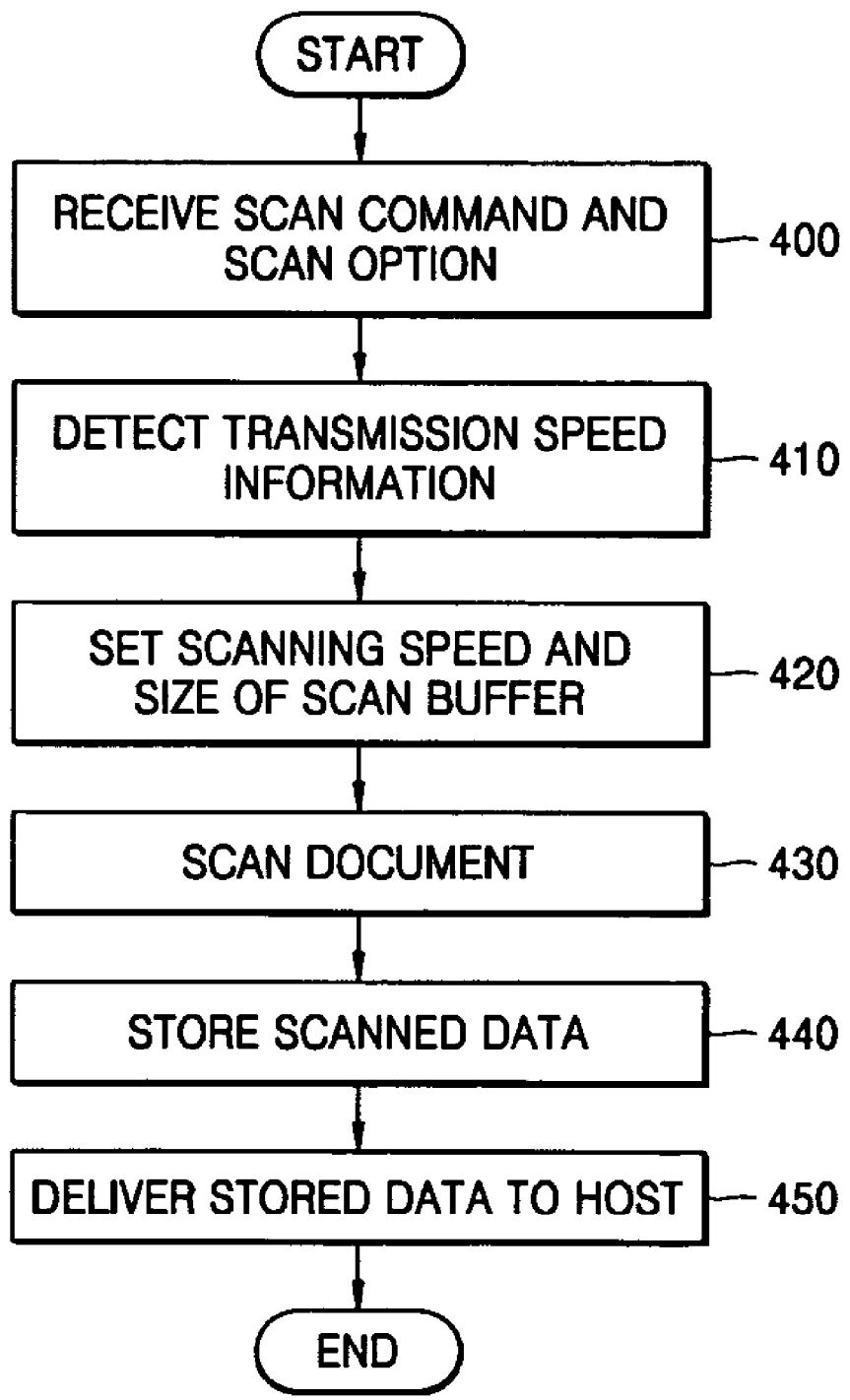
FIG. 4 is a flowchart illustrating operations of a method of controlling a scanner according to an embodiment of the present general inventive concept.

FIG. 4 is a flowchart illustrating operations of a method of controlling a scanner according to an embodiment of the present general inventive concept.

Referring to FIGS. 2 and 4, the scan command and the scan option are received through the host interface 200 from the host (operation 400).

The transmission speed information corresponding to the transmission standard of the host interface 200 is detected by the transmission speed detector 210 (operation 410). The types of the transmission standards and a method of detecting the transmission speed information are the same as described above. The detected transmission speed can be displayed by the display 230.

The appropriate scanning speed and the appropriate size of the scan buffer are then obtained based on the scan resolution and the detected transmission speed information by the controller 220 (operation 420). Here, the scanning speed can be a motor timer value, as described above. Also, the scan resolution may be included in the scan option received through the host interface 200, or may be preset as a fixed value in the scanner.

The document is then scanned by the scanning part 240 at the appropriate scanning speed according to the scan option (operation 430).

The storage space for the scanned data that corresponds to the size of the scan buffer obtained at the operation 420 is assigned within the memory 250 and the scanned data is stored therein (operation 440).

The stored data is read by the controller 220 and delivered to the host through the host interface 220 (operation 450).

Figure 5:
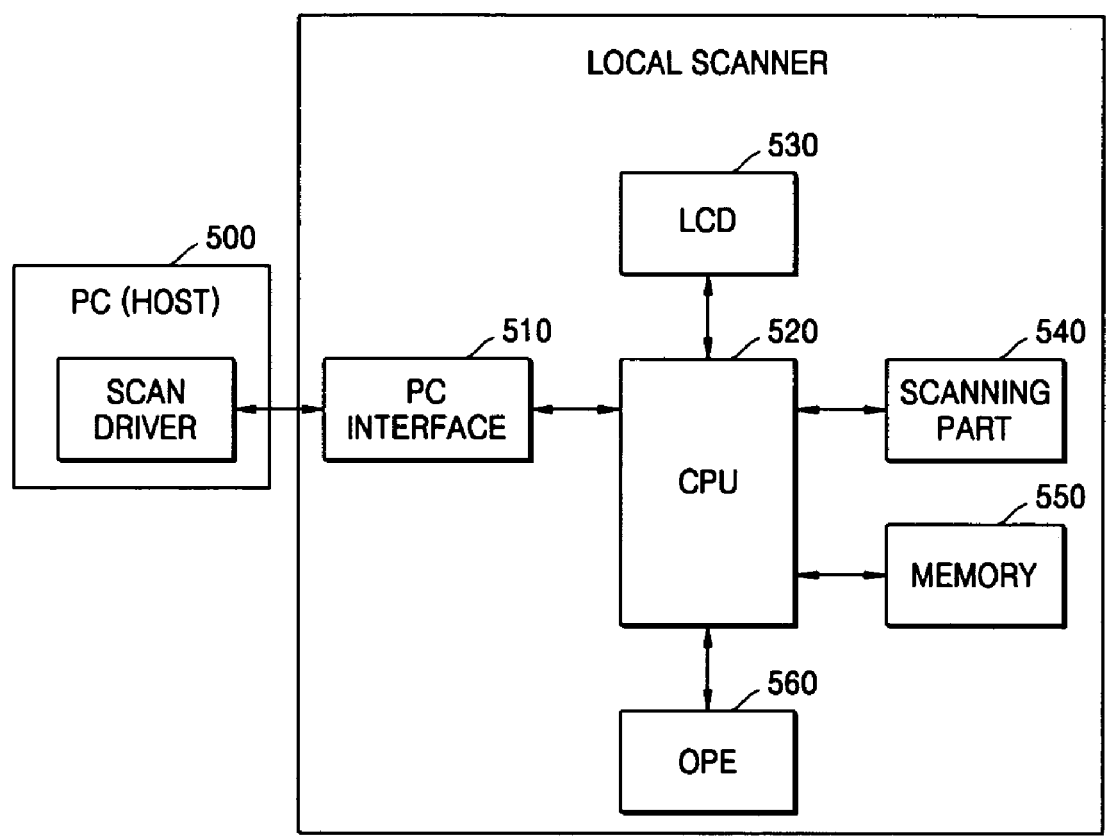
FIG. 5 is a block diagram illustrating a local scanner according to an embodiment of the present general inventive concept.

FIG. 5 is a block diagram illustrating a local scanner according to an embodiment of the present general inventive concept.

Referring to FIG. 5, a personal computer (PC) 500, which is a host, transmits a scan command and a scan option to a PC interface 510 of the local scanner through a scan driver. The PC interface 510 delivers the received scan command and scan option to a central processing unit (CPU) 520. The PC interface 510 transmits and receives data to and from the host using a transmission standard, such as a USB transmission standard and an IEEE1284 transmission standard, as described above. The PC interface 510 has a transmission speed detector to detect transmission speed information, such as a USB transmission standard version and a mode thereof, and delivers the transmission speed information to the CPU 520.

The CPU 520 controls overall operations of the local scanner using a predetermined program. Particularly, the CPU 520 sets a scanning speed and a size of a scan buffer based on a scan resolution included in the scan option and the detected transmission speed information, and controls a scanning part 540 and a memory 550 of the local scanner accordingly. The CPU 520 can use one of the above-described lookup tables corresponding to the transmission standard so as to set the scanning speed and the size of the scan buffer. The lookup table can be stored in the memory 550.

An LCD 530 displays information under control of the CPU 520 and can display the detected transmission speed information.

The scanning part 540 scans a document at the set scanning speed and the scan resolution under control of the CPU 520.

The memory 550 secures a storage space for scanned data that corresponds to the set size of the scan buffer under control of the CPU 520, and stores the data scanned by the scanning part 540 therein. The stored data is read by the CPU 520 and transmitted to the scan driver of the PC through the PC interface 510.

The local scanner can include an OPE 560, which is an operating panel, and has a plurality of keys. The OPE 560 provides key data (generated by pressing the keys) to the CPU 520.

Figure 6:
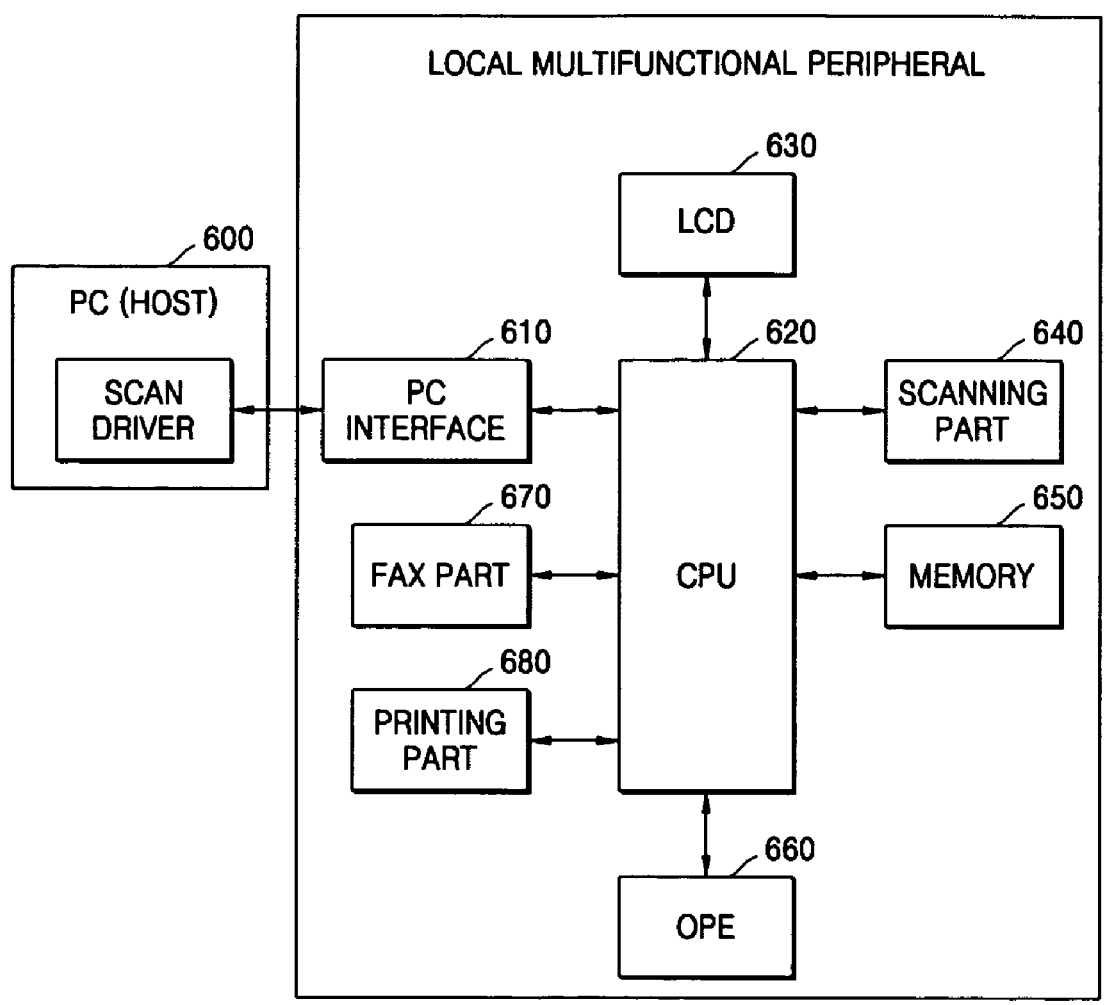
FIG. 6 is a block diagram illustrating a local multifunctional peripheral (MFP) according to an embodiment of the present general inventive concept.

FIG. 6 is a block diagram illustrating a local multifunctional peripheral (MFP) according to an embodiment of the present general inventive concept.

Operations and functions of a PC 600, a PC interface 610, a CPU 620, an LCD 630, a scanning part 640, a memory 650, and an OPE 660 of the local MFP of FIG. 6 are the same as the PC 500, the PC interface 510, the CPU 520, the LCD 530, the scanning part 540, the memory 550, and the OPE 560 of the local scanner of FIG. 5.

A fax part 670 transmits and receives data through a telephone line under control of the CPU 620. The data can include the data scanned by the scanning part 540. The transmitted and received data may be stored in the memory 650.

A printing part 680 prints the data received by the fax part 670 or the data scanned by the scanning part 640 under control of the CPU 620.

Figure 7:
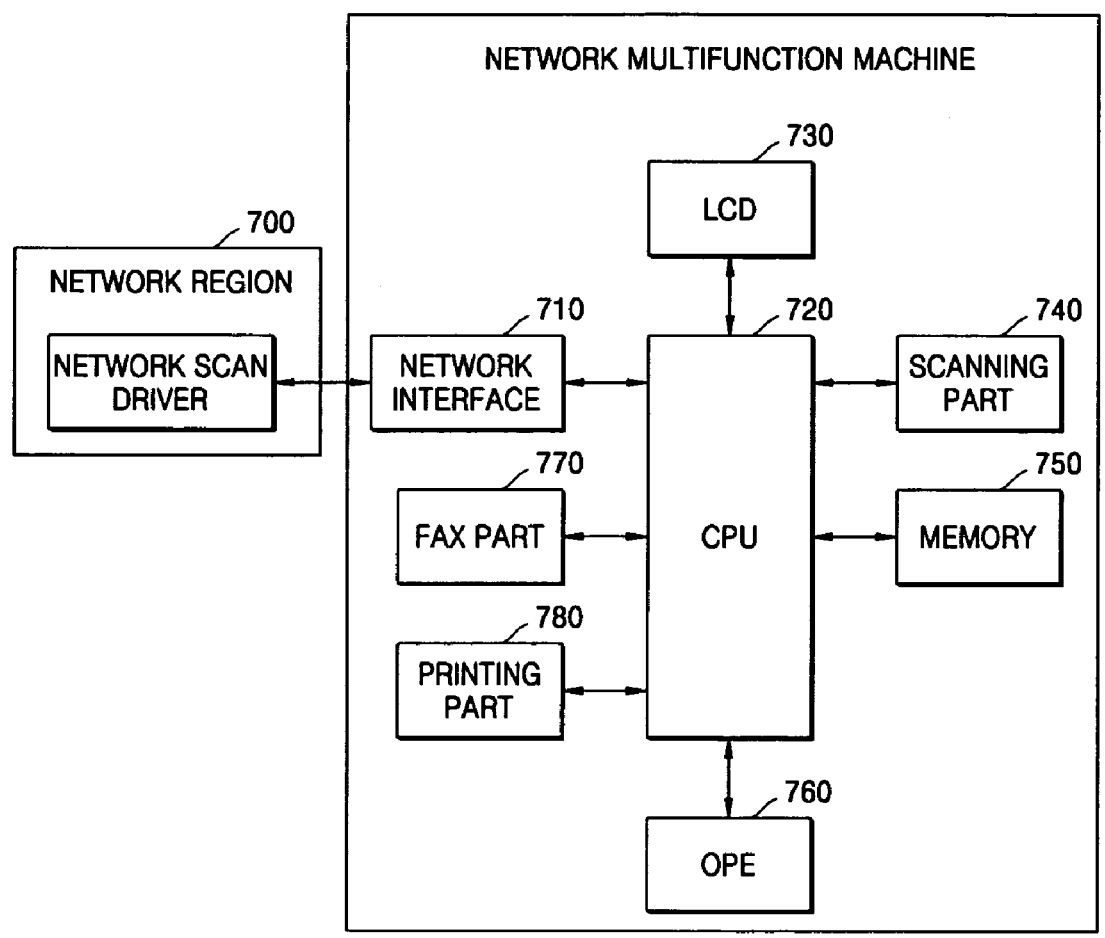
FIG. 7 is a block diagram illustrating a network multifunctional peripheral (MFP) according to an embodiment of the present general inventive concept.

FIG. 7 a block diagram illustrates a network multifunctional peripheral (MFP) according to an embodiment of the present general inventive concept.

Operations and functions of a CPU 720, an LCD 730, a scanning part 740, a memory 750, an OPE 760, a fax part 770, and a printing part 780 of the network MFP of FIG. 7 are the same as the PC 600, the PC interface 610, the CPU 620, the LCD 630, the scanning part 640, the memory 650, the OPE 660, the fax part 670, and the printing part 680 of the local MFP of FIG. 6.

A network interface 710 transmits and receives data through a network scan driver included in a network region 700. The network multifunctional peripheral (MFP) uses a network standard, such as a LAN, as a transmission standard. The network interface 710 can have a network card to detect a network response time during transmission and reception of packets through a ping. That is, the network interface 710 can also act as a transmission speed detector.

The present general inventive concept can also be embodied as computer-readable codes on a computer-readable recording medium. The computer-readable recording medium is any data storage device that can store data which can be thereafter read by a computer system. Examples of the computer-readable recording media include read-only memory (ROM), random-access memory (RAM), CD-ROMs, magnetic tapes, floppy disks, optical data storage devices, and carrier waves (such as data transmission-through the Internet). The computer-readable recording medium can also be distributed over network-coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

According to the present embodiment, the computer-readable recording medium may have a program to perform a method of controlling a scanner by detecting data transmission speed information between a host and the scanner, and controlling a scanning speed on a scan resolution of the scanner and the detected transmission speed information. It is possible that the method includes detecting a transmission standard used by the scanner to communicate with a host, and controlling a scanning speed of the scanner based on the detected transmission standard. It is also possible that the computer-readable recording medium may include codes to perform a method of determining a scanning speed of the scanner based on a data transmission speed at which the scanner communicates with a host, and scanning data at the determined scanning speed. The method may be performed in at least one of a host, an image forming apparatus, and an image forming system having the host and the image forming apparatus.

As described above, according to an embodiment of the present inventive concept, an apparatus to control a scanner may include a transmission standard detector to detect a transmission standard used by the scanner to communicate with a host, and a controller to control a scanning speed of the scanner based on the detected transmission standard. The transmission standard may be at least one of a USB standard, an IEEE 1284 standard, and a network standard. When the transmission standard detector detects the USB standard and determines a version of the USB standard and a mode of the determined version, the controller controls the scanning speed of the scanner based on the determined version and mode of the USB standard. When the transmission standard detector detects the IEEE 1284 standard, the transmission standard detector determines a mode of the IEEP 1284 standard, and the controller controls the scanning speed of the scanner based on the determined mode of the IEEE 1284 standard. When the transmission standard detector detects the network standard, the transmission standard detector determines a network response time of the network standard, and the controller controls the scanning speed of the scanner based on the determined network response time.

According to the present embodiment, the apparatus to control the scanner may further include a memory to store a look up table including a plurality of types of transmission standards and a plurality of scanning speeds corresponding to the plurality of types of transmission standards such that the controller selects the scanning speed from the look up table corresponding to the type of the transmission standard detected by the transmission standard detector. The controller controls a size of a scan buffer of the scanner based on the detected transmission standard.

As described above, according to an embodiment of the present general inventive concept, an image scanning apparatus may include a scanning unit to scan data at a scanning speed, a host interface to transmit the scanned data to a host at a data transmission speed, and a controller to control the scanning speed of the scanning unit based on the data transmission speed of the host interface. Here, the host interface includes a predetermined transmission standard, and the controller controls the scanning speed of the scanning unit based on the predetermined transmission standard.

As described above, according to the embodiments of the present general inventive concept, it is possible to solve a problem associated with a memory due to inharmony between a transmission speed and a scanning speed, and to perform an efficient scanning process by controlling the scanning speed and a buffer size of a scanner to be appropriate for the transmission speed between the host and the scanner.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to control a scanner comprising:
a transmission speed detector to detect data transmission speed information between a host and the scanner; and
a controller to control a scanning speed of the scanner based on a scan resolution and the detected transmission speed information,
wherein the controller controls a size of a scan buffer in the scanner based on the scan resolution and the detected transmission speed information.

2. The apparatus of claim 1, further comprising:
a display to display the detected transmission speed information.

3. The apparatus of claim 1, wherein the scan resolution is provided from the host or preset in the apparatus to control the scanner.

4. The apparatus of claim 1, wherein the controller comprises a lookup table to store information regarding scan resolutions, transmission speeds, scanning speeds, and sizes of the scan buffer therein and determines whether one of the information corresponds to the scan resolution and the transmission speed information.

5. The apparatus of claim 1, wherein the transmission speed detector detects transmission speed information of a wired/wireless interface between the host and the scanner.

6. The apparatus of claim 1, wherein the transmission speed detector detects transmission speed information including at least one of a USB (universal serial bus) version, a mode thereof, a mode of an IEEE1284, which are transmission standards to transmit data between the host and the scanner.

7. The apparatus of claim 1, wherein the transmission speed detector detects the transmission speed information including a network response time of a network transmission standard to transmit data between the host and the scanner.

8. The apparatus to control a scanner according to claim 1, wherein the scan buffer is located in memory in the scanner, and
   the controller controls an amount of memory allocated to the scan buffer based on the scan resolution and the detected transmission speed information.

9. An image scanning apparatus comprising:
   a host interface to communicate with a host at a transmission speed;
   a transmission speed detector to detect transmission speed information regarding the transmission speed of the host interface;
   a controller to determine a scanning speed based on the detected transmission speed information;
   a scanning part to scan data at the determined scanning speed; and
   a memory having a scan buffer to temporarily store the scanned data,
   wherein the host interface transmits the stored scanned data from the scan buffer to the host.

10. The image scanning apparatus of claim 9, wherein the controller determines a size of the scan buffer based on the detected transmission speed information.

11. The image scanning apparatus of claim 9, wherein the controller determines the scanning speed based on the detected transmission speed information and a desired scanning resolution.

12. The image scanning apparatus of claim 9, wherein the transmission speed information comprises information regarding a type of transmission standard used by the host interface to communicate with the host.

13. The image scanning apparatus of claim 9, wherein the transmission speed information comprises the transmission speed at which the host interface communicates with the host.

14. The image scanning apparatus of claim 9, further comprising:
   a memory to store a look up table including a plurality of scanning speeds corresponding to a plurality of possible values of the transmission speed information,
   wherein the controller selects the scanning speed from the look up table corresponding to the detected transmission speed information.

15. The image scanning apparatus of claim 9, wherein the host interface comprises:
   at least one of a USB interface, an IEEE 1284 interface, and a network interface.

16. A method of controlling a scanner, the method comprising:
   detecting data transmission speed information between a host and the scanner;
   controlling a scanning speed of the scanner based on a scan resolution and the detected transmission speed information; and
   controlling a size of a scan buffer in the scanner based on the scan resolution and the detected transmission speed information.

17. The method of claim 16, further comprising:
   displaying the detected transmission speed information.

18. The method of claim 16, wherein the scan resolution is provided from the host or preset.

19. The method of claim 16, wherein the detecting of the data transmission speed information comprises:
   detecting the transmission speed information of a wired/wireless interface between the host and the scanner.

20. The method of claim 16, wherein the detecting of the data transmission speed information comprises:
   detecting the transmission speed information including at least one of a USB (universal serial bus) version, a mode of a USB version, and a mode of an IEEE1284, which are transmission standards to communicate between the host and the scanner.

21. The method of claim 16, wherein the detecting of the data transmission speed information comprises:
   detecting the transmission speed information including a network response time.

22. A method of controlling a scanner, the method comprising
   detecting a transmission standard used by the scanner to communicate with a host;
   controlling a scanning speed of the scanner based on the detected transmission standard; and
   controlling a size of a scan buffer of the scanner based on the detected transmission standard.

23. A method of controlling a scanner, the method comprising:
   determining a scanning speed of the scanner based on a data transmission speed at which the scanner communicates with a host;
   scanning data at the determined scanning; and
   controlling a size of a scan buffer of the scanner based on the determined data transmission speed.

24. The method of claim 23, further comprising:
   transmitting the scanned data to the host at the data transmission speed.

* * * * *